United States Patent [19]

Callies

[11] Patent Number: 5,152,373
[45] Date of Patent: Oct. 6, 1992

[54] CRANKSHAFT LUBRICATING SYSTEM

[75] Inventor: John G. Callies, Fostoria, Ohio

[73] Assignee: Callies Performance Products, Fostoria, Ohio

[21] Appl. No.: 732,902

[22] Filed: Jul. 19, 1991

[51] Int. Cl.$^5$ .............................................. F01M 1/04
[52] U.S. Cl. .................................. 184/6.5; 123/196 R
[58] Field of Search ................... 184/6.5, 6.28, 11, 13; 123/196 R; 384/288, 913

[56] References Cited

U.S. PATENT DOCUMENTS

| 2,907,411 | 10/1959 | Leach | 184/6.5 |
| 2,936,857 | 5/1960 | Etchells et al. | 184/6.5 |
| 3,033,313 | 5/1962 | Love | 184/6.5 |
| 3,069,926 | 12/1962 | Hoffman et al. | 184/6.5 |
| 3,713,513 | 1/1973 | Harris et al. | 184/6.5 |
| 3,785,459 | 1/1974 | Patchen | 184/6.5 |
| 4,023,547 | 5/1977 | Reisacher | 184/6.5 |

FOREIGN PATENT DOCUMENTS 0410125 3/1945 Italy ................................. 184/6.28

OTHER PUBLICATIONS

Venk et al., American Technical Society, "Automotive Engines", Oct. 7, 1987, pp. 105-133.

Primary Examiner—Ira S. Lazarus
Assistant Examiner—Alan B. Cariaso
Attorney, Agent, or Firm—Emch, Schaffer, Schaub & Porcello Co.

[57] ABSTRACT

A crankshaft has a lubricating system in which passages for directing lubricating oil are precisely positioned to provide lubrication into the main bearing journals in areas removed from the main bearing load area and dispense such lubricating oil through outlets in the connecting rod journals precisely positioned with respect to the maximum gas pressure load area and maximum inertia load area for each connecting rod journal.

33 Claims, 3 Drawing Sheets

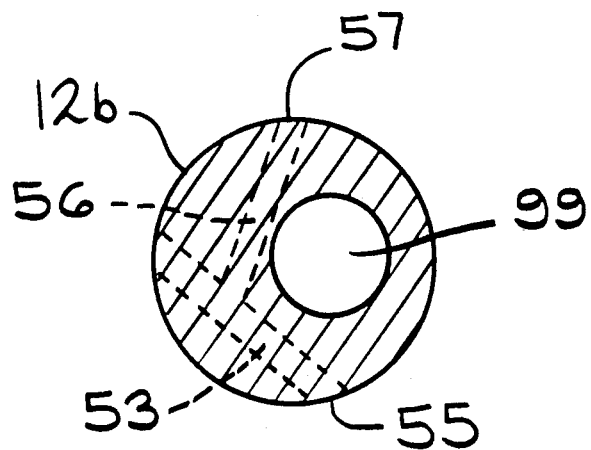
FIG. 7
FIG. 8
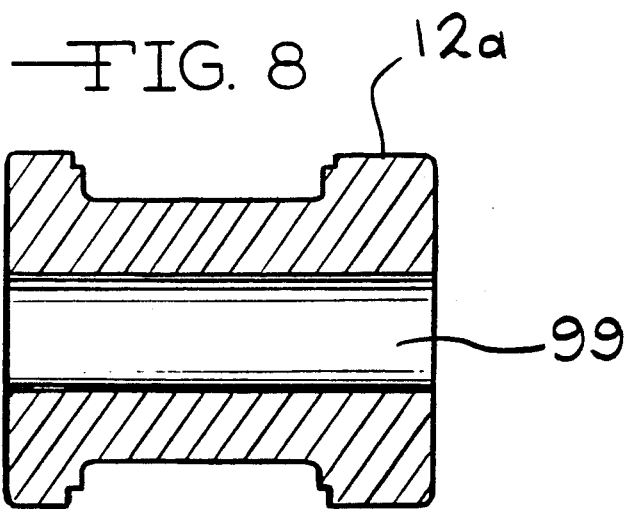
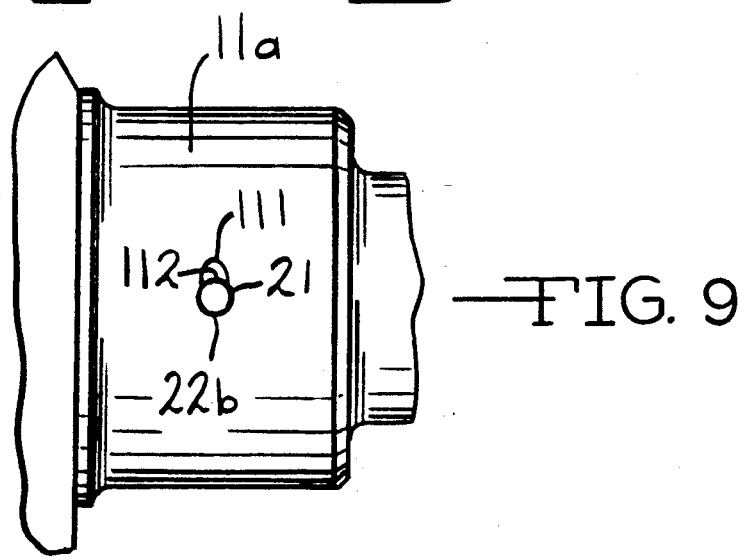
FIG. 9

CRANKSHAFT LUBRICATING SYSTEM

TECHNICAL FIELD

The present invention relates to a new and improved crankshaft having an oil feed system uniquely designed for high perfromance engines such as those used in racing.

BACKGROUND ART

In engines for automotive and similar use, it is important to provide adequate lubrication to all parts of the engine including the crankshaft and all parts connected thereto. It has been known heretofore to provide drilled oil passages from the main bearing journals to the connecting rod journals. For example, the utilization of oil passages in crankshafts is described in Chapter 5 (pages 105 to 133) of a book entitled *Automotive Engines*, Third Edition, 14th Printing 1967 by Ernest Venk and Walter Billiet and published by the American Technical Society (copy enclosed) which is incorporated herein by reference. In engines utilizing this feature, oil is supplied under pressure to the main bearings and flows through the oil passages to lubricate the connecting rod bearings. Greater pressure is imposed on the bearings and journals during the power and compression strokes than is imposed during the intake and exhaust strokes. Accordingly, it is desirable that an adequate amount of oil be provided to all areas with an extra thickness of oil being provided to the areas of the connecting rod journals subjected to maximum gas pressure load and maximum inertia load and that oil be supplied to each of the connecting rod journals and bearings on a balanced basis so that no area of the crankshaft or the bearings is starved for oil.

DISCLOSURE OF THE INVENTION

The present invention is directed to a crankshaft having lubricating passages specifically designed and located to maximize lubrication to those areas requiring it while insuring equal oil delivery to each of the connecting rod journals and bearings so that none of the connecting rod journals or bearings is starved for oil. Under the present invention the passages are located away from the maximum bearing load area of the main bearing journals and away from those areas of the connecting rod journals subjected to maximum gas pressure load and maximum inertia load in order to avoid weakening of the crankshaft in those areas which are subjected to the highest loads.

The maximum bearing load is defined as the highest load in pounds to which the main bearings are subjected at a specific operating rate in revolutions per minute (RPMs). As will be appreciated by those skilled in the art, the greater the number of RPMs, the greater the load on the main bearings. The area or location of the bearing which is subject to such maximum bearing load (the maximum bearing load area) is determined as a result of dynomometer engine testing as will be hereinafter described.

The maximum gas pressure load is defined as the gas pressure at a particular RPM measured in pounds per square inch (PSI) showing the highest pressure load at a particular rotation degree of connecting rod journal. The maximum gas pressure load area is that area of the connecting rod journal which is subjected to the maximum gas pressure load.

The maximum inertia load is the highest inertia load, measured in pounds, of the reciprocating assembly. The maximum inertia load area is that area of a particular connecting rod journal which is subject to the maximum inertia load and will always be bottom dead center of the rod. The areas of maximum bearing load and maximum gas pressure load are determined as a result of dynomometer engine testing. It is begun by installing a pressure-transducer in each chamber of the cylinder head for each cylinder. For example, in a V-8 engine, eight pressure-transducers are used, one in each of the eight chambers of such V-8 engine.

A phase angle indicator is positioned on the front of the crankshaft. The phase angle indicator will tell what position the crankshaft is running while data is taken off the pressure-transducers. Typically, on a race engine, the operator will run a sweep on the dynomometer from 4500, 5000, 5500, 6000, 6500, 7000, 7500, 8000, 8500 and 9000 RPM. From this data it can be determined, through a mathematical formula, at what crankshaft angle this occurs, when the firing order occurs and the result yields the load bearing stress areas on each crank journal and each main bearing journal.

Under the present invention, oil inlet feed holes are positioned in the main bearing journals $90° +/- 10°$ prior to the area of highest bearing load. A network of passages extends through the crankshaft in a predetermined configuration providing a balanced flow so that no area is starved for oil and yet providing a configuration which will deliver oil to outlets in the connecting rod journals 80° to 90° before the area of maximum gas pressure load and provide an extra amount of oil to the area of the connecting rod journals subjected to maximum inertia load. Thus, the network of passages is provided with inlets having a specific orientation with respect to the maximum bearing load area and outlets with a specific orientation with respect to the maximum gas pressure load area and the maximum inertia load area.

Additionally, the crankshaft and lubricating system of the present invention permits a reduction in the mass of the connecting rod journal with a selectively positioned lightening hole, such positioning being in areas substantially protected from loadings on such connecting rod journals.

Accordingly, it is an object of the present invention to provide a crankshaft with an integral oil system specifically designed to withstand the rigors of racing and other high performance engines.

BRIEF DESCRIPTION OF THE DRAWINGS

FIG. 7 is a sectional view taken through line 7—7 of FIG. 1.

FIG. 8 is a sectional view taken through line 8—8 of FIG. 1.

FIG. 9 is an enlarged fragmentary elevational view of the number 1 main bearing journal.

BEST MODE OF CARRYING OUT INVENTION

Figure 1:
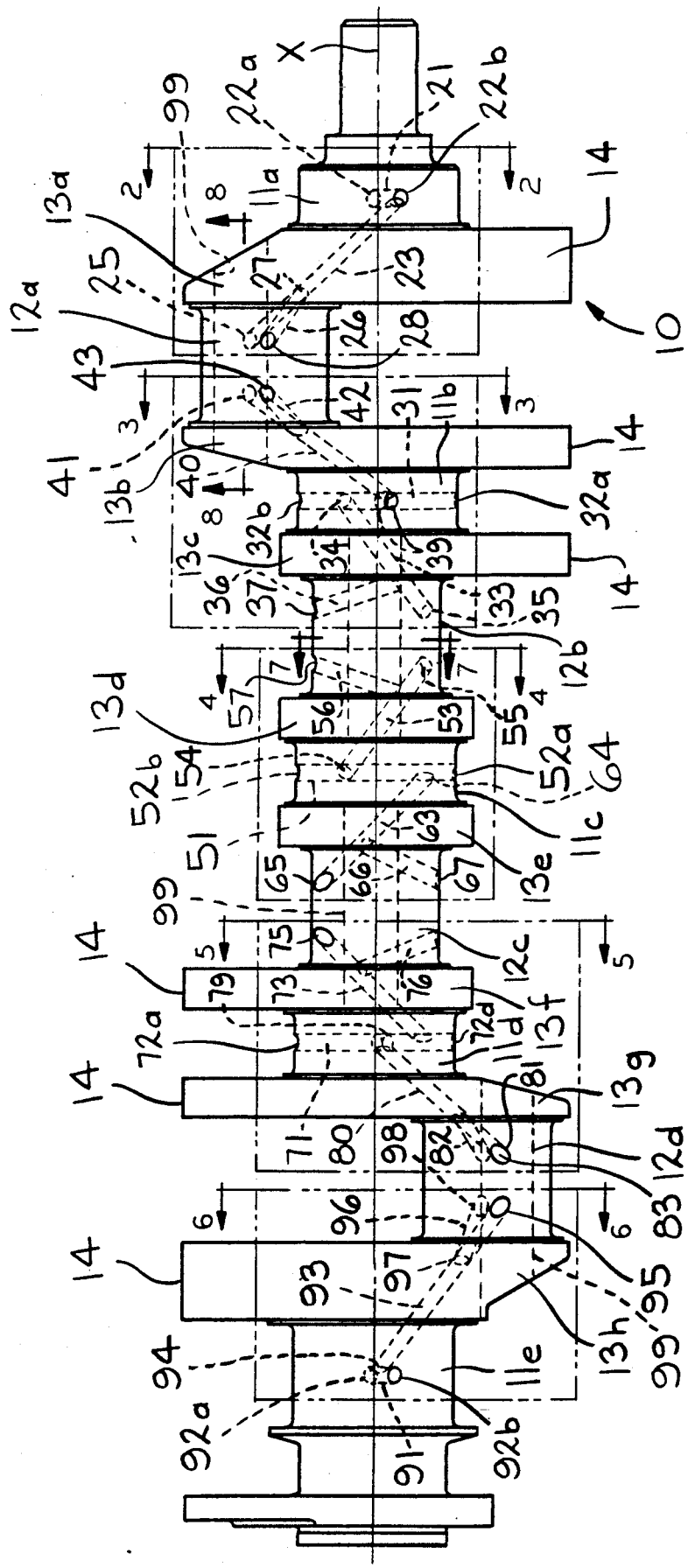
FIG. 1 is an elevational view of the crankshaft lubricating system of the present invention.

Referring now to FIG. 1, there is shown a crankshaft generally designated by the number 10 extending along an axis X. The crankshaft 10 as shown is designed for a V-8 engine, however, it should be understood that the crankshaft and lubricating system of the present invention is not limited to V-8 engines but can also be utilized with 4-cylinder engines, 6-cylinder engines (straight and V-type) and straight 8-cylinder engines. The crankshaft 10 includes five main bearing journals, namely, No. 1 main bearing journal 11a, No. 2 main bearing journal 11b, No. 3 main bearing journal 11c, No. 4 main bearing journal 11d and No. 5 main bearing journal 11e, each of which lies on the axis X. The crankshaft 10 includes four connecting rod journals, namely, No. 1 connecting rod journal 12a, No. 2 connecting rod journal 12b, No. 3 connecting rod journal 12c, and No. 4 connecting rod journal 12d, each of which is offset from the axis X, with the end connecting rod journals, 12a (No. 1 connecting rod journal) and 12d (No. 4 connecting rod journal) positioned 180° from each other and the center connecting rod journals 12b (No. 2 connecting rod journal) and 12c (No. 3 connecting rod journal) positioned 90° from the end connecting rod journals 12a and 12d and 180° from each other.

The connecting rod journals are connected to the main bearing journals by crankarms. Thus, as shown in FIG. 1, connecting rod journal 12a is connected between crankarm 13a extending from main bearing journal 11a and crankarm 13b extending from main bearing journal 11b. Connecting rod journal 12b is connected between crankarm 13c extending from main bearing journal 11b and crankarm 13d extending from main bearing journal 11c. Connecting rod journal 12c is connected between crankarm 13e extending from main bearing journal 11c and crankarm 13f extending from main bearing journal 11d. Connecting rod journal 12d is connected between crankarm 13g extending from main bearing journal 11d and crankarm 13h extending from main bearing journal 11e.

Each of the crankarms 13a-13h has a counterbalance weight 14 extending therefrom in a direction on the opposite side of the axis X from that of the connecting rod journal secured thereto.

Referring to FIGS. 2-6, each of the main bearing journals 11a-11e has an area designated by the letter A which is the area subjected to a higher bearing load than other areas of such bearing journal as the crankshaft 10 is rotated by connecting rods (not shown) connected to the connecting rod journals 12a-12d and powered by pistons (not shown). Such area is hereinafter referred to as "maximum bearing load area." Additionally, each of the connecting rod journals 12a-12d has an area designated by the letter B which is the area subjected to the maximum gas pressure load and an area designated by the letter C which is the area subjected to the maximum inertia load. The crankshaft is rotated in the direction indicated by the letter D in FIGS. 2-6.

Figures 2, 3:
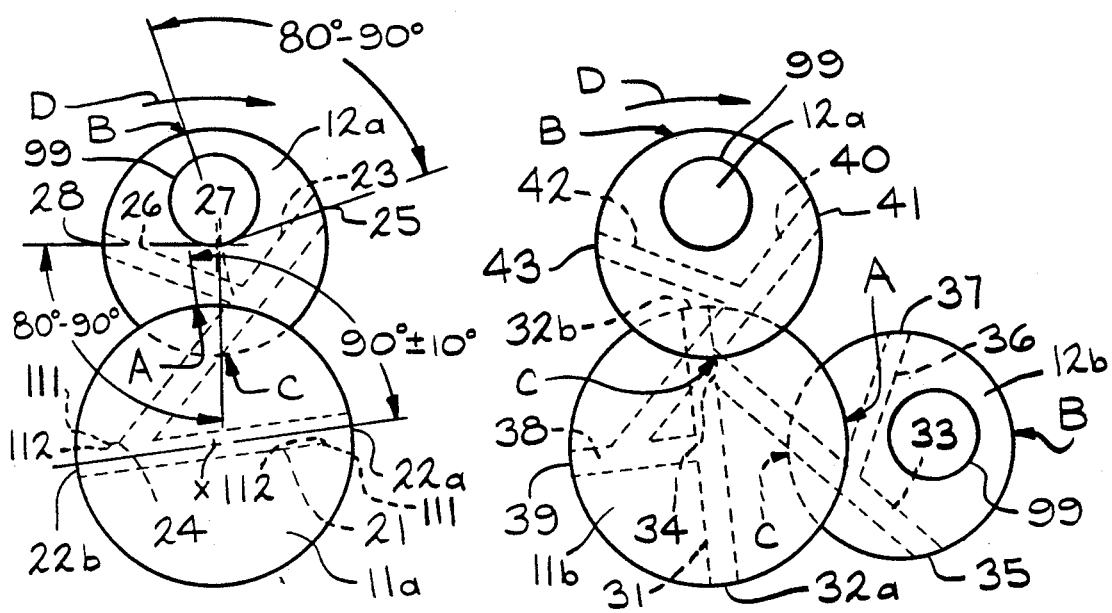
FIG. 2 is a view looking in the direction of line 2—2 and showing schematically the oil passages in the number 1 main bearing journal and leading from it to the number 1 connecting rod journal.
FIG. 3 is a view looking in the direction of line 3—3 and showing schematically the oil passages in the number 2 main bearing journal and leading from it to the number 1 connecting rod journal and to the number 3 connecting rod journal.

Under the present invention, lubricating oil passages are provided in the main bearing journals with inlet openings to such passages being located 90°+/−10° prior to the maximum bearing load area A for such main bearing journal. Thus, as shown in FIG. 1 and schematically in FIG. 2, the No. 1 main bearing journal 11a has a first passage 21 having inlet openings at each end 22a and 22b, respectively, and extending diametrically through the main bearing journal 11a. As can be seen in FIG. 2, the inlet opening 22a is 90°+/−10° away from and prior to the maximum bearing load area A. The opposing inlet opening 22b is also 90°+/−10° away from the maximum bearing load area A but trailing it. Thus, there is never an oil hole or inlet opening close to the maximum bearing load area A.

The inlet openings 22a and 22b of the first passage 21 through the main bearing journal 11a are chamfered in the leading direction as may be seen in FIG. 2 where the chamfers at each of said inlet openings 22a and 22b are indicated by the numeral 111. Each of the chamfers 111 is formed such that it enlarges the passage 21 in such leading direction by approximately 0.375 inch. As can be seen the chamfers 111 taper toward the cylindrical wall of the passage 21 and intersect the cylindrical wall of the passage 21 at a point 112 approximately 0.200 inch inwardly from the respective inlet openings 22a and 22b. Each of the other main bearing journals 11b, 11c, 11d and 11e has a similar chamfer 111 at each end of its respective first passage 31, 41, 51, 71 and 91. However, in the interest of clarity and in order to maintain the drawing in clearly readable form, the chamfers 111 have not been shown for any of the main bearing journals other than 11a.

Lubricating oil is fed to No. 1 connecting rod journal 12a from the first passage 21 by means of a second passage 23 having a first end 24 opening into the first passage 21 at a point in the main bearing journal 11a closer to one of the inlet openings 22b than the other inlet opening 22a but spaced from such one inlet opening 22b. The second passage 23 extends along a straight-line path through the crankarm 13a and through the connecting rod journal 12a to an outlet 25. The outlet 25 is located at an area of the connecting rod journal 12a between 80° and 90° before the area of maximum gas pressure load B. If the outlet 25 were positioned closer to the area of maximum gas pressure load, the life expectancy of the crankshaft 10 would be reduced. Additionally, there is provided a third passage 26 extending through the connecting rod journal 12a and a portion of the crankarm 13a from a juncture 27 with the second passage 23, which juncture 27 serves as the inlet from the second passage 23 into the third passage 26 and terminating at outlet 28 located between 80° and 90° before the area of maximum inertia load C which is 160°-180° from the outlet 25.

Thus, oil is supplied under pressure to the main bearing journal 11a, flows into both inlet openings 22a and 22b, through the first passage 21 and into the second passage 23 extending to the No. 1 connecting rod journal 12a and out of the outlet 25 to lubricate the connecting rod bearings (not shown). Additionally, a portion of such oil flows from the second passage 23 into the third passage 26 and out of the outlet 28 to provide additional lubricant to the connecting rod bearings in the maximum inertia load area C.

It is desirable that the crankshaft system operate effectively with as low an oil pressure requirement as possible. The oil pressure required to operate at a given number of RPMs may be determined by the formula:

$$P = 4.6 \times 10^{-7} \times RPM^2 \times (RI^2 - RO^2)$$

where

P = revolutions per minute
RO = the radius of the main bearing journal
RI = the distance from the axis of the main bearing journal to the point of the second passage which is closest to such axis. For example in FIG. 2, RI is the distance from the axis X to the point on the internal wall of passage 23 which is the closest to such axis X.

As will be appreciated, the larger RI, the lower will be the required oil pressure for a given operating speed in RPMs.

As previously discussed and as may be seen, particularly in FIG. 2, the inlet opening 22a is located 90° prior to the maximum bearing load area A and the opposing inlet opening 22b is located 90° after the maximum bearing load area A. Therefore, there is never an oil hole or inlet opening close to the maximum bearing load area A. It has been found that if the oil inlet openings are close to the maximum bearing load area, the life of the main bearing journal and the bearing associated therewith will be substantially reduced. Although it is preferred that the angle be as close to 90° as possible, satisfactory results can be achieved even if the angle varies by plus or minus 10°.

In addition to the specific positioning of the passages 21, 23 and 28, such passages have specific sizes in proportion to each other. The passage 21 extending diametrically across the main bearing journal 11a is the largest of such passages and has a diameter of 0.250 inch. The second passage 23 extending from the passage 21 to the outlet 25 of connecting rod journal has a smaller size with a diameter of 3/16 inch. The third passage 26 extending from the second passage 23 to the outlet 28 has an even smaller size with a diameter in the range of ⅛ (0.125) inch. This is based on oil viscosities 10-50. If it is desired to use oil having a viscosity higher than 50, the oil passages 21 and 23 should both have a diameter of 0.250 inch and the passage 28 should have a diameter of 0.1875. Thus, the passages sizes have been worked out based upon the crank strokes or revolutions per minute and viscosity of the oil to be used in operating the high performance engines.

Referring now to FIG. 3, there is shown schematically the passages for delivering lubricating oil from the No. 2 main bearing journal 11b to the No. 1 connecting rod journal 12a and the No. 2 connecting rod journal 12b. As may be seen in FIG. 3, the maximum bearing load area for the main bearing journal 11b is designated by the letter A while the maximum gas pressure load area for each of the connecting rod journals 12a and 12b is indicated by the letter B shown on each of the connecting rod journals 12a and 12b. The maximum inertia load area is indicated by the letter C on each of the connecting rod journals 12a and 12b.

Main bearing journal 11b has a first passage 31 having inlet openings 32a and 32b, respectively, and extending diametrically through the main bearing journal 11b. Such first passage 31 is substantially the same size as the first passage 21 of main bearing journal 11a. As will be appreciated from viewing FIG. 1 in conjunction with FIG. 3, lubricating oil entering the passage 31 through the inlets 32a and 32b is intended to be directed both to the No. 1 connecting rod journal 12a and to the No. 2 connecting rod journal 12b in order to lubricate the connecting rod bearings of the connecting rods (not shown) attached to each of such connecting rod journals. As is the case with the No. 1 main bearing journal 11a, one of the inlets of the No. 2 main bearing journal 11b, namely, inlet 32a, is located 90° +/− 10° prior to the maximum bearing load area A of such main bearing journal 11b. A second passage 33 extends at an angle from a juncture 34 communicating with passage 31 to an outlet 35 at the No. 2 connecting rod journal 12b located 80° to 90° before the area of maximum gas pressure load B of such connecting rod journal. This second passage 33 is substantially the same size as the second passage 23 extending from the No. 1 main bearing journal 11a to connecting rod journal 12a. Additionally, a third passage 36 extends from the second passage 33 to an outlet 37 on the opposite side of the connecting rod journal 12b from the outlet 35. Thus, lubricating oil is provided at points 180° removed from each other on the connecting rod journal 12b. The third passage 36 is substantially the same size as the third passage 26 and its outlet 37 is located between 80° and 90° before the area of maximum inertia load C for such connecting rod journal 12b which is 160°-180° from the outlet 35.

In addition, there is provided a further passage 38 in the main bearing journal 11b itself extending from a juncture with passage 31 and at a right angle thereto and terminating at an inlet opening 39 located 180° +/− 10° from the maximum bearing load area A of such main bearing journal 11b. The passage 38 is the same size as the first passage 31. Extending at an angle from the passage 38 is another passage 40 extending through the main bearing journal 11b, crankarm 13b and through the No. 1 connecting rod journal 12a and terminating in an outlet 41. The outlet 41 is located 80° to 90° before the area of maximum gas pressure load B for such connecting rod journal 12a. An additional passage 42 extends from the passage 40 to another outlet 43 positioned 80°-90° before the area of maximum inertia load C which is 160°-180° from the outlet 41 of the connecting rod journal 12a. The passage 40 is the same size as the passage 33 and the passage 42 is the same size as the passage 26 and 36.

Thus, as will be appreciated, oil will flow into the inlet openings 32a and 32b and into the third inlet opening 39 of the main bearing journal 11b and be carried throught the passage 31 to passage 33 and its interconnecting passage 36 and out of the outlets 35 and 37 which are spaced 160°-180° apart to provide lubricating oil to the connecting rod bearings of the connecting rod fastened to the connecting rod journal 12b. Oil will also be supplied from the passage 38 into passage 40 and to interconnecting passage 42 and out of the 160°-180° spaced apart outlets 41 and 43 of the connecting rod journal 12a thus providing lubricating oil to the connecting rod bearings of the connecting rod fastened to connecting rod journal 12a. This is in addition to the lubricating oil supplied to the connecting rod journal 12a from the No. 1 main bearing journal 11a through passages 23 and 26 as previously described.

Figure 4:
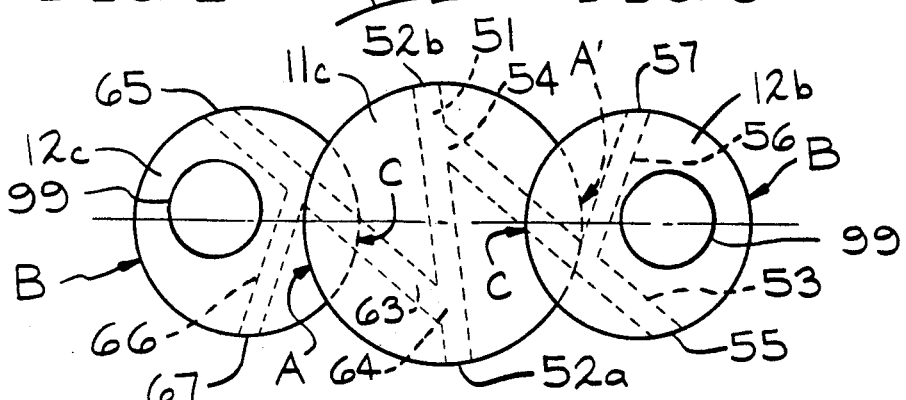
FIG. 4 is a view looking in the direction of line 4—4 and showing schematically the oil passages in the number 3 main bearing journal and the passages leading from it to the number 2 connecting rod journal and to the number 3 connecting rod journal.

Referring now to FIG. 4, there is illustrated schematically No. 3 main bearing journal 11c and the interconnecting network of passages delivering lubricating oil from it to No. 2 connecting rod journal 12b and to No. 3 connecting rod journal 12c. As in the case of the previously described main bearing journals, the area of maximum bearing load is designated. However, in contrast to the previously described main bearing journals 11a and 11b, the No. 3 main bearing journal 11c has two areas of maximum bearing load designated A and A', respectively. The reason for this is that the connecting rod journals which are adjacent thereto, namely, No. 2 connecting rod journal 12b and No. 3 connecting rod journal 12c, are located 180° from each other. This is in contrast to the No. 1 main bearing journal 11a which has only one connecting rod journal 12a adjacent thereto and the No. 2 main bearing journal 11b which, although having two connecting rod journals adjacent thereto, namely, No. 1 connecting rod journal 12a and No. 2 connecting rod journal 12b, has such connecting rod journals located 90° from each other.

Additionally in FIG. 4, the letter B indicates the area of maximum gas pressure load for each of the connecting rod journals 12b and 12c and the letter C indicates the maximum inertia load area for each of such connecting rod journals.

There is provided in the No. 3 main bearing journal 11c a passage 51 extending diametrically across thereacross and having inlet openings 52a and 52b on opposite sides thereof. As can be seen in FIG. 4, the inlet opening 52b is 90°+/−10° prior to the maximum loading area A while the inlet opening 52a is 90°+/−10° prior to the second maximum bearing loading area A'. The passage 51 is the same size as passages 21 and 31.

A second passage 53 extends from the passage 51 from juncture 54 through the main bearing journal 11c, crankarm 13d and connecting rod journal 12b to an outlet 55 located at an area of such connecting rod journal 12b between 80° and 90° before the area of maximum gas pressure load B. A third passage 56 communicates with the second passage 53 and extends to an outlet 57 on the connecting rod journal 12b located between 80° and 90° before the area of mamimum inertia load C for such connecting rod journal 12b which is 160°-180° from the outlet 55.

Similarly, there is provided another passage 63 which also extends from the passage 51, from an inlet juncture 64 through the crankarm 13e and through connecting rod journal 12c and terminating in an outlet opening 65 located at an area of such connecting rod journal 12c between 80° and 90° before the area of maximum gas pressure load B. Additionally, another passage 66 extends from the passage 63 through the connecting rod journal 12c to an outlet opening 67 located between 80° and 90° before the area of maximum inertia load C for such connecting rod journal 12c which is 160°-180° from the outlet opening 65. The passages 53 and 63 are substantially the same size as passages 23, 33 and 40 while the passages 56 and 66 are substantially the same size as passages 26, 36 and 42.

Thus, lubricating oil is provided in equal amounts through a balanced network of passages from the No. 3 main bearing journal 11c to opposing outlets 55 and 57 of connecting rod journal 12b and to opposing outlets 65 and 67 of connecting rod journal 12c.

Figures 5, 6:
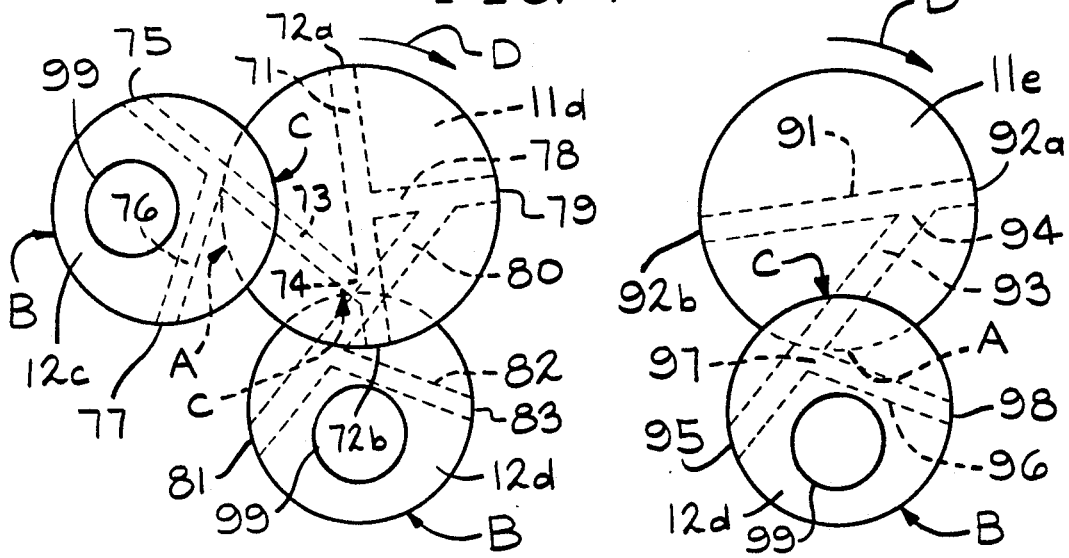
FIG. 5 is a view looking in the direction of line 5—5 and showing schematically the oil passages in the number 4 main bearing journal and passages leading from it to the number 3 connecting rod journal and to the number 4 connecting rod journal.
FIG. 6 is a view looking in the direction of line 6—6 and showing schematically the oil passages in the number 5 main bearing journal and the passages leading from it to the number 4 connecting rod journal.

Referrig now to FIG. 5, there is illustrated schematically the No. 4 main bearing journal 11d and the two connecting rod journals adjacent thereto, namely, the No. 3 connecting rod journal 12c and the No. 4 connecting rod journal 12d. In FIG. 5, the letter A designates the maximum bearing load area of the main bearing journal 11d while the letter B designates the maximum gas pressure load area for the No. 3 connecting rod journal 12c and the No. 4 connecting rod journal 12d, respectively, and the letter C designates the maximum inertia load area for each of the respective connecting rod journals 12c and 12d.

The No. 4 main bearing journal 11d is provided with a first passage 71 having inlet openings 72a and 72b, respectively, and extending diametrically through the main bearing journal 11d. The first passage is substantially the same size as the first passage 21 of main bearing journal 11a.

As will be appreciated from viewing FIG. 1 in conjunction with FIG. 5, lubricating oil entering the passage 71 through the inlets 72a and 72b is intended to be directed both to the No. 3 connecting rod journal 12c and to the No. 4 connecting rod journal 12d in order to lubricate the connecting rod bearings of the connecting rods (not shown) attached to each of such connecting rod journals. The passage 71 extends diametrically across the main bearing journal 11d from inlets 72a and 72b at opposite ends with one of the inlets, namely, inlet 72a being located 90°+/−10° prior to the maximum bearing load area A of such main bearing journal 11d. A second passage 73 extends at an angle from a juncture 74 communication with passage 71 to an outlet 75 at the No. 3 connecting rod journal 12c located 80° to 90° before the area of maximum gas pressure load B of such connecting rod journal 12c. Additionally, a third passage 76 extends from the second passage 73 to an outlet 77 on substantially the opposite side of the connecting rod journal 12c from the outlet 75 and 80° to 90° before the area of maximum inertia load C for such connecting rod journal 12c. Thus, lubricating oil is provided at points 160°-180° removed from each other on the connecting rod journal 12c.

In addition, there is provided a third passage 78 in the main bearing journal 11d itself extending from a juncture with passage 71 and at a right angle thereto and terminating in an inlet opening 79 located 180°+/−10° from the maximum bearing load area A of such main bearing journal 11d. The passage 78 is substantially the same size as the first passage 71. Extending at an angle from the passage 78 is another passage 80 extending through the main bearing journal 11d, crankarm 13g and through the No. 4 connecting rod journal 12d and terminating in an outlet 81 located 80° to 90° before the area of maximum gas pressure load B for such connecting rod journal 12d. An additional passage 82 extends from the passage 80 to another outlet 83 positioned 80° to 90° before the area of maximum inertia load C for such connecting rod journal 12d which is 160°-180° from the outlet 81 of the connecting rod journal 12d. The passages 73 and 80 are substantially the same size as the passage 23, 33, 40, 53 and 63. The passages 76 and 82 are substantially the same size as the passages 26, 36, 42, 56 and 66.

Thus, as will be appreciated, oil will flow into the inlet openings 72a and 72b and into the third inlet opening 79 of the main bearing journal 11d and be carried through the passage 71 to passage 73 and its interconnecting passage 76 and out of the outlets 75 and 77 which are spaced 160°-180° apart to provide lubricating oil to the connecting rod bearings of the connecting rod fastened to the connecting rod journal 12c. Oil will also be supplied from the passage 78 into passage 80 and to interconnecting passage 82 and out of the 160°-180° spaced apart outlets 81 and 83 of the connecting rod journal 12d thus providing lubricating oil to the connecting rod bearing of the connecting rod fastened to connecting rod journal 12d.

Referring to FIG. 6, there is shown schematically the No. 5 main bearing journal 11e on which the letter A designates the maximum bearing load area and connecting rod journal 12d on which the letter B designates the maximum gas pressure load area and the letter C the maximum inertia load area.

As shown in FIG. 1 and schematically in FIG. 6, the No. 5 main bearing journal 11e has a first passage 91 having inlet openings 92a and 92b at each end, respectively, and extending diametrically through the main bearing journal 11e. The inlet opening 92a is 90°+/−10° away from and prior to the maximum bearing load area A and the opposing inlet opening 92b is also 90°+/−10° away from the maximum bearing load area A for such main bearing journal 11e but trailing it. Thus, as with the other bearing journals, there is never an oil hole or inlet close to the maximum bearing load area. A. Lubricating oil is fed to the No. 4 connecting rod journal 12d from the inlet passage 91 by means of a second passage 93 having a juncture 94 opening into the inlet passage 91 at a point in the bearing journal 11e closer to one of the inlet openings 92a than the other 92b but spaced from such inlet opening 92a. The additional passage 93 extends along a straight-line path through the crankarm 13h and through the connecting rod journal 12d to an outlet 95 located 80° to 90° before the maximum gas pressure load area B. Additionally, there is provided a third passage 96 extending through the connecting rod journal 12d and a portion of the crankarm 13h from a juncture 97 with the additional passage 93, which juncture 97 serves as the inlet from the additional passage 93 into the third passage 96 and terminating at outlet 98 located 80° to 90° before the maximum inertia load area C for such connecting rod journal 12d which is 160° to 180° from outlet 95.

The passage 91 is substantially the same size as the passages 21, 31, 51, and 71. The passage 93 is substantially the same size as passages 23, 33, 40, 53, 63, 73 and 80, while the passage 96 is substantially the same size as passages 26, 36, 42, 56, 66, 76 and 82. Thus, oil is supplied under pressure to the No. 5 main bearing journal 11e, flows through the passage 91 and into the second passage 93 extending to the No. 4 connecting rod journal 12d and out of the outlet 95 to lubricate the connecting rod bearings (not shown) and connecting rod connected thereto. Additionally, a portion of such oil flows from the second passage 93 into the third passage 96 and out of the outlet 98 to provide additional lubricant to the connecting rod bearings.

The precisely aligned network of oil lubricating passages, positioned as set forth in the foregoing description with the size relationship as described provides a crankshaft oil system having a long life expectancy even when subjected to the high rigors of racing and other high performance demand uses. Additionally, the efficiency of the lubricating system of passages permits the crankshaft to be provided with lightening holes which reduce the weight of the crankshaft from that which would otherwise be required. Thus, as may be seen in FIGS. 1, 7 and 8, each of the connecting journals 12a through 12d has formed therein a hole 99 whose function is to reduce the weight of the crankshaft 10. Each hole 99 is so positioned in the crankshaft as to be substantially protected from cracking due to loadings that come through such connecting rod journals. Thus, the lightening hole 99 for a typical crankshaft may have a diameter of ⅜ inch and be so positioned that the distance from the outer surface of the connecting rod journal, for example, the journal 12b as shown in FIG. 7, is 0.300 inch. In addition, the distance from the lightening hole 99 to the closest of the passages, for example, passages 53 and 56 in the connecting rod journal 12b of FIG. 7 is 0.180 inch.

Using the crankshaft with its lubricating oil system described herein and operating at 10,000 rpm, it is desired that oil be supplied at a pressure of 70-75 psi.

Many modifications will be readily apparent to those skilled in the art. Accordingly, the scope of the present invention should be limited only by the scope of the appended claims.

I claim:

1. In a crankshaft system including a crankshaft extending along a longitudinal axis and having
   (a) a plurality of main bearing journals each having a circular cross-sectional configuration and lying on said axis, each of said main bearing journals having an area of maximum bearing load subjected to greater bearing loads than other areas of said main bearing journal;
   (b) a plurality of connecting rod journals having means connected thereto for receiving forces causing said crankshaft to rotate about said axis; and
   (c) crankarms connecting each of said connecting rod journals to two of said main bearing journals; the improvement comprising a plurality of oil passages, including passages extending from an inlet at each of said main bearing journals, through an adjacent crankarm and connecting rod journal connected thereto to an outlet, said inlet being positioned 90°+/−10 ° before said area of maximum bearing load.

2. In a crankshaft system according to claim 1, the further improvement wherein each of said inlets has a chamfer in the leading direction as said crankshaft rotates about said axis; siad chamfer enlarging that portion of the passage of said main bearing journal adjacent said inlet such that the maximum distance across said inlet is at least 1.5 times the diameter of said passage and tapers to meet said passage at an area approximately 0.20 inch inwardly from said inlet.

3. In a crankshaft system according to claim 1, the further improvement comprising an additional oil passage in at least one of said bearing journals, said additional oil passage having an inlet 180°+/−10° from said area of maximum bearing load and extending to the passage communicating directly with said inlet.

4. In a crankshaft system according to claim 1, wherein each of said connecting rod journals have an area of maximum gas pressure laod subjected to greater loads from power means acting thereon than other areas, the further improvement comprising said outlet being located 80° to 90° before the area of maximum gas pressure load.

5. In a crankshaft system according to claim 4 the further improvement comprising an additional passage in each of said connecting rod journals extending to a second outlet on said connecting rod journal positioned 80° to 90° before the area of maximum inertia load and communicating with a passage extending from a main bearing journal to said connecting rod journal.

6. For use in a crankshaft system capable of operating in excess of 4500 revolutions per minute including a crankshaft extending along a longitudinal axis having
- (a) a plurality of main bearing journals each having a circular cross-sectional configuration and lying on said axis, each of said main bearing journals having an area of maximum bearing load subjected to greater bearing loads than other areas of said main bearing journal;
- (b) a plurality of connecting rod journals having means connected thereto for receiving forces causing said crankshaft to rotate about said axis; and
- (c) crankarms connecting each of said connecting rod journals to two of said main bearing journals; the improvement comprising a plurality of oil passages, including a first passage extending diametrically across a main bearing journal from inlets at opposite ends thereto, a second passage communicating with said first passage and extending through an adjacent crankarm and connecting rod journal connected thereto to an outlet, one of said inlets being positioned 90°+/−10° from the area of main bearing journal subjected t maximum bearing load.

7. In a crankshaft system according to claim 6, the further improvement wherein each of said inlets has a chamfer in the leading direction as said crankshaft rotates about said axis; said chamfer enlarging that portion of said one passage adjacent each of said inlets and tapering to meet said one passage at an area inwardly from each said inlet.

8. In a crankshaft system according to claim 6, wherein said connecting rod journal has an area of maximum gas pressure load and wherein said outlet is positioned 80° to 90° before the area of maximum gas pressure load.

9. In a crankshaft system according to claim 6 wherein said connecting rod journal has an area of maximum inertia load, the further improvement comprising a third passage communicating with said second passage and extending to a second outlet on said connecting rod journal positioned 80° to 90° before the area of maximum inertia load.

10. In a crankshaft system including a crankshaft extending along a longitudinal axis having
- (a) a plurality of main bearing journals each having a circular cross-sectional configuration and lying on said axis, each of said main bearing journals having an area of maximum bearing load subjected to greater bearing loads than other areas of said main bearing journal;
- (b) a plurality of connecting rod journals having means connected thereto for receiving forces causing said crankshaft to rotate about said axis, each of said connecting rod journals having an area of maximum gas pressure load and an area of maximum inertia load; and
- (c) crankarms connecting each of said connecting rod journals to two of said main bearing journals; the improvement comprising a plurality of oil passages, including a first passage extending diametrically across a main bearing journal from inlets at opposite ends thereof, a second passage communicating with said first passage and extending through an adjacent crankarm and connecting rod journal connected thereto to an outlet, one of said inlets being positioned 90°+/−10° from the area of main bearing journal subjected to maximum bearing load, a third passage communicating with said second passage and extending to a second outlet on said connecting rod journal positioned 80° to 90° before the area of maximum inertia load, a fourth passage in at least one of said main bearing journals, said fourth passage having an inlet 180°+/−10° from said area of maximum bearing load and extending to said first passage, and a fifth passage extending from said fourth passage through a second crankarm adjacent said main bearing journal and a second connecting rod journal connected thereto to an outlet positioned 80° to 90° before the area of maximum gas pressure load of said second connecting rod journal.

11. In a crankshaft system according to claim 10 the further improvement comprising a sixth passage communicating with said fifth passage and extending to an outlet on said second connecting rod journal positioned 80° to 90° before the area of maximum inertia load.

12. A crankshaft lubricating system in a crankshaft lying along an axis and having a plurality of spaced apart main bearing journals lying on said axis, a plurality of spaced apart connecting rod journals spaced from said axis and a plurality of crankarms extending from said main bearing journals and supporting said connecting rod journals, each connecting rod journal being supported by two crankarms, each of said main bearing journals having an area around its circumference subjected to maximum bearing load, said lubricating system comprising a series of oil passages including
- (a) a first passage in each main bearing journal extending diametrically thereacross from a first aperture to a second aperture, said first aperture being located between 80° to 100° around said circumference from said area of maximum bearing load, and
- (b) a plurality of second passages, at least one communicating with each of said first passages and extending through each of said crankarms and said connecting rod jounals to a first set of outlets in each of said connecting rod journals.

13. A crankshaft lubricating system according to claim 12 further including at least one chamfer in said first passage extending from a maximum size at one of said apertures and tapering to a minimum size inwardly from said one aperture, said chamfer being located in the leading direction of intended rotation of said crankshaft about said axis.

14. A crankshaft lubricating system according to claim 12 further including chamfers in said first passage extending from a maximum size at each of said apertures and tapering to a minimum size inwardly from said apertures, said chamfers being located in the leading direction of intended rotation of said crankshaft about said axis.

15. The crankshaft lubricating system according to claim 12, wherein each of said connecting rod journals has an area of maximum gas pressure load and wherein said first set of outlets is located between 80° and 90° before said area of maximum gas pressure load.

16. The crankshaft lubricating system according to claim 15, wherein each of said connecting rod journals has a third passage extending from said second passage to a second set of outlets located 180°+/−10° from said first set of outlets.

17. A crankshaft lubricating system in a crankshaft lying along an axis and having a plurality of spaced apart main bearing journals lying on said axis, a plurality of spaced apart connecting rod journals spaced from said axis and a plurality of crankarms extending from said main bearing journals and supporting said connecting rod journals, each connecting rod journal being supported by two crankarms, each of said main bearing journals having an area around its circumference subjected to maximum bearing load, said lubricating system comprising a series of oil passages including (a) a first passage in each main bearing journal extending diametrically thereacross from a first aperture to a second aperture, said first aperture being located between 80° to 100° around said circumference from said area of maximum bearing load, and (b) a plurality of second passages, at least one communicating with each of said first passages and extending through each of said crankarms and said connecting rod journals to a first set of outlets in each of said connecting rod journals, at least one of said main bearing journals having an additional passage extending from said first passage outwardly to an inlet aperture located 180°+/−10° from said area of maximum bearing load.

18. The crankshaft lubricating system according to claim 17, wherein said additional passage is perpendicular to said first passage.

19. The crankshaft lubricating system according to claim 17, wherein said connecting rod journal has an area of maximum gas pressure load and further including passage means extending from said additional passage through a connecting rod journal to an outlet aperture 80° to 90° before the area of maximum gas pressure load.

20. The crankshaft lubricating system according to claim 19, wherein said connecting rod journal has an area of maximum inertia load and further including second passage means extending from said passage means through said connecting rod journal to an outlet aperture in said connecting rod journal 90° to 90° before the area of maximum inertia load.

21. A crankshaft lubricating system in a crankshaft lying along an axis and having a plurality of spaced apart main bearing journals lying on said axis a plurality of spaced apart connecting rod journals spaced from said axis and a plurality of crankarms extending from said main bearing journals and supporting said connecting rod journals, each connecting rod journal being supported by two crankarms, each of said main bearing journals having an area around its circumference subjected to maximum bearing load, said lubricating system comprising a series of oil passages including (a) a first passage in each main bearing journal extending diametrically thereacross from a first aperture to a second aperture, said first aperture being located between 80° to 100° around said circumference from said area of maximum bearing load, and (b) a plurality of second passages, at least one communicating with each of said first passages and extending through each of said crankarms and said connecting rod journals to a first set of outlets in each of said connecting rod journals, at least one of said main bearing journals having a third passage extending from said first passage through a second crankarm extending therefrom and the connecting rod journal attached thereto to an outlet.

22. The crankshaft lubricating system according to claim 21, wherein said second passage intersects said first passage in an area spaced from said first aperture by a predetermined distance and said third passage intersects said first passage in an area spaced from said second aperture by said predetermined distance and the angle at which said second passage intersects said first passage is equal to the angle at which said third passage intersects said first passage.

23. A crankshaft comprising
a plurality of main bearing journals, each of said main bearing journals lying on a longitudinal axis and having a circular cross-sectional configuration, at least one area of each said main bearing journal subjected to maximum bearing load;
a plurality of connecting rod journals, each of said connecting rod journals having a circular cross-sectional configuration and having centerlines each lying on an axis parallel to and spaced from said longitudinal axis, said connecting rod journals each being supported by a pair of crankarms extending from adjacent ones of said main bearing journals, each of said connecting rod journals having an area of maximum pressure load and an area of maximum inertia load; and,
a network of oil passages including first passages extending diametrically across each of said main bearing journals and having a pair of inlets at opposite ends thereof, one of said inlets being spaced 90°+/−10° from said area of maximum bearing load, each of said main bearing journals having a second passage extending from a juncture with said first passage, through a crankarm extending from each of said main bearing journals and through said connecting rod journals supported thereby to an outlet located 80° to 90° before the maximum pressure load of each of said connecting rod journals, and a third passage extending from a juncture with each of said second passages to an outlet in each said connecting rod journal located 80° to 90° before the area of maximum inertia load.

24. A crankshaft according to claim 23 further including at least one chamfer in said first passage extending from a maximum size at one of said inlets tapering to a minimum size inwardly from said one inlet, said chamfer being located in the leading direction of intended rotation of said crankshaft about said axis.

25. A crankshaft according to claim 23 further including chamfers in each of said first passages extending from a maximum size at each of said apertures and tapering to a minimum size inwardly from said apertures said chamfers being located only in the leading direction of intended rotation of said crankshaft about said axis.

26. A crankshaft comprising
a plurality of main bearing journals, each of said main bearing journals lying on a longitudinal axis and having a circular cross-sectional configuration, at least one area of each said main bearing journal subjected to maximum bearing load;
a plurality of connecting rod journals, each of said connecting rod journals having a circular cross-sectional configuration and having centerlines each lying on an axis parallel to and spaced from said longitudinal axis, said connecting rod journals each being supported by a pair of crankarms extending from adjacent ones of said main bearing journals, each of said connecting rod journals having an area of maximum gas pressure load and an area of maximum inertia load; and,
a network of oil passages including first passages extending diametrically across each of said main bearing journals and having a pair of inlets at opposite ends thereof, one of said inlets being spaced 90°+/−10° from said area of maximum bearing load, each of said main bearing journals having a second passage extending from a juncture with said first passage, through a crankarm extending from each of said main bearing journals and through said connecting rod journals supported thereby to an outlet located 80° to 90° before the maximum gas pressure load of each of said connecting rod journals, and a third passage extending from a juncture with each of said second passages to an outlet in each said connecting rod journal located 80° to 90° before the area of maximum inertia load and further including an additional passage in at least one of said main bearing journals extending from an inlet located 180°+/−10° from said maximum bearing load area and extending to said first passage at right angles thereto.

27. A crankshaft according to claim 23, wherein each of said first passages has a predetermined size, of approximately ¼ inch, each of said second passages has a size between 3/16 inch and ¼ inch, and each of said third passages has a size between ⅛ inch and 3/16 inch.

28. A crankshaft according to claim 26, wherein said additional passage has a cross-sectional size equal to the cross-sectional size of said first passages.

29. A crankshaft according to claim 23, wherein each of said connecting rod journals has a lightening hole therethrough parallel to the axis of each of said connecting rod journal and spaced from the surface of said connecting rod journal at least 0.3 inch and spaced from the closest passage at least 0.180 inch.

30. The crankshaft according to claim 26, further including passage means extending from said additional passage through a crankarm and connecting rod journal to an outlet aperture 80° to 90° before the area of maximum gas pressure load.

31. The crankshaft according to claim 30, further including second passage means extending from said passage means to an outlet aperture in said connecting rod journal 80° to 90° before the area of maximum inertia load.

32. The crankshaft according to claim 23, wherein at least one of said main bearing journals has a third passage extending from said first passage through a second crankarm extending therefrom and the connecting rod journal attached thereto to an outlet.

33. The crankshaft according to claim 32, wherein said second passage intersects said first passage in an area spaced from said first aperture by a predetermined distance and said third passage intersects said first passage in an area spaced from said second aperture by said predetermined distance and the angle at which said second passage intersects said first passage is equal to the angle at which said third passage intersects said first passage.

* * * * *